Dec. 16, 1969     A. D. DELAGRANGE     3,484,777

LINEAR INTERPOLATOR CIRCUIT

Filed June 29, 1965     2 Sheets-Sheet 1

INVENTOR
Arthur D. Delagrange

BY *(signature)*     ATTORNEY

*H. R. Booker*     AGENT

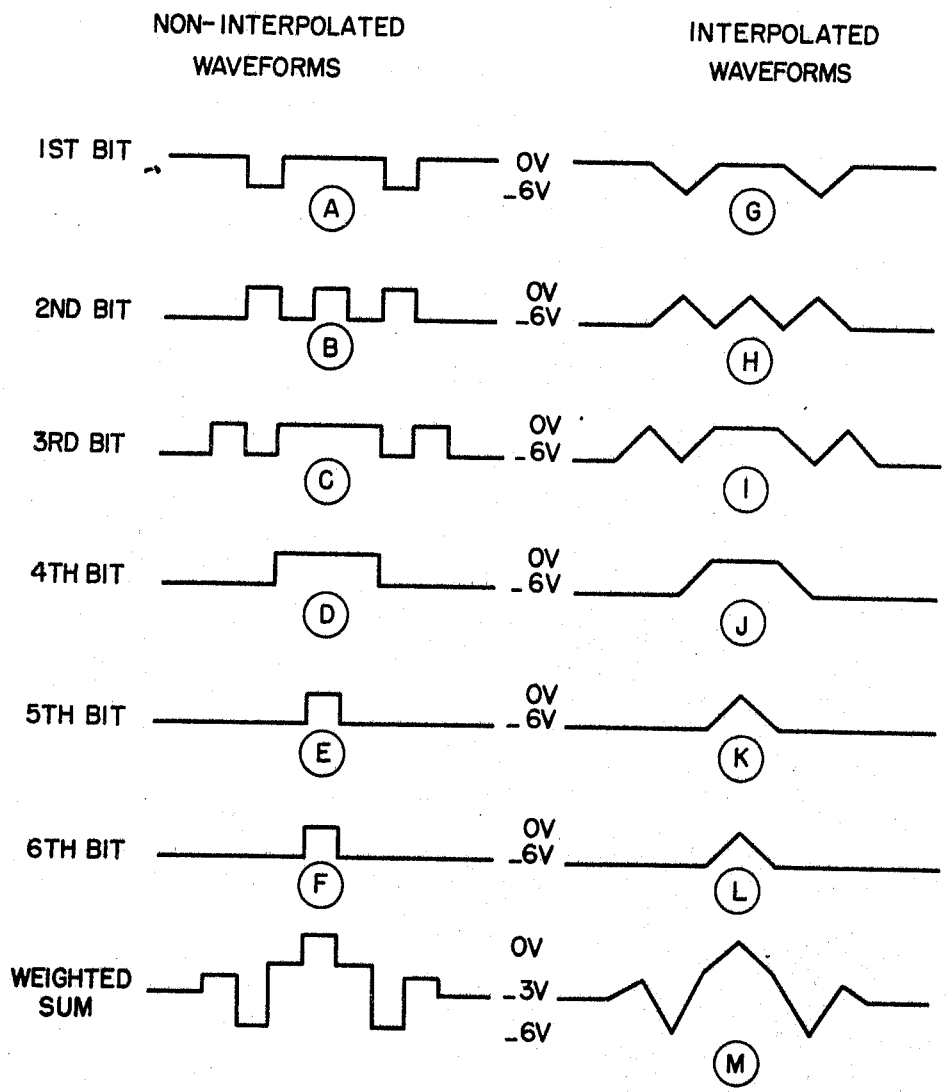

3,484,777
Patented Dec. 16, 1969

1

3,484,777
LINEAR INTERPOLATOR CIRCUIT
Arthur D. Delagrange, Silver Spring, Md., assignor to the United States of America as represented by the Secretary of the Navy
Filed June 29, 1965, Ser. No. 468,181
Int. Cl. H04l 3/00
U.S. Cl. 340—347   7 Claims

ABSTRACT OF THE DISCLOSURE

A linear interpolator circuit for converting a plurality of pulse inputs into an output in the form of a plurality of connected straight line segments, including: a plurality of interpolating channels, each having its output connected to a multi-input summer; each of the channels including: four semiconductor diodes arranged to form a four-arm, four-junction switching network with a bias applied to each network biasing junction, a capacitor connected between ground and the network output junction, and a transistor connected in emitter follower configuration with the network output junction.

---

The invention described herein may be manufactured and used by or for the Government of the United States of America for governmental purposes without the payment of any royalties thereon or therefor.

This invention relates to a wave shaping circuit and more particularly to a wave shaping and smoothing circuit for converting changing binary number pulse inputs to a continuous waveform for visual presentation.

The invention was designed to provide a visual analog waveform for existing digital correlators which supply quantized digital output information. Correlator outputs are quantized in certain time intervals (fore example, 52 microseconds) which represent a correlation function with a number of sample points, but the most interesting part of a correlogram function is the correlogram peak which may be only a few hundred microseconds wide. With a normal sampling interval, e.g., 52 microseconds, it is apparent that this portion of the correlogram function is represented by only a very small number of sample points.

Previously, visual display of the quantized information was made available by either directly converting the output information to a corresponding voltage level the instant it changes with no time smoothing, or by converting the information to a corresponding voltage level and then passing the information through a resistor-capacitor smoothing network. The former method was unsatisfactory for visual display since the waveform was made up of a series of unconnected horizontal straight line segments of different heights. The latter method gave a waveform which was a continuous line made up of connected exponential-shaped segments which made visual observation easier, but which distorted the information. To obviate these difficulties the present invention contemplates a smoothing circuit consisting of a plurality of linear interpolators, one for each bit of quantized information, and a summing network which produces a smooth correlogram made up of connected straight line segments.

Accordingly, it is an object to provide a wave shaping circuit which converts a binary pulse input to an interpolated waveform having a plurality of connected straight line segments of varying slopes wherein each change in slope represents a change in binary value.

Another object is the provision of a linear interpolator circuit for smoothing quantized binary number inputs to a continuous voltage waveform of connected straight line segments for visual display.

2

A further object is to provide non-distorted correlogram analog waveform for visual observation from quantized digital information representing sample points of a correlogram function.

Figure 1B:
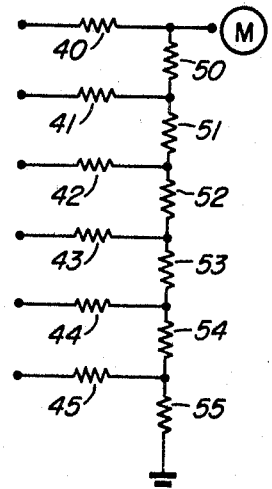
Figure 1A:
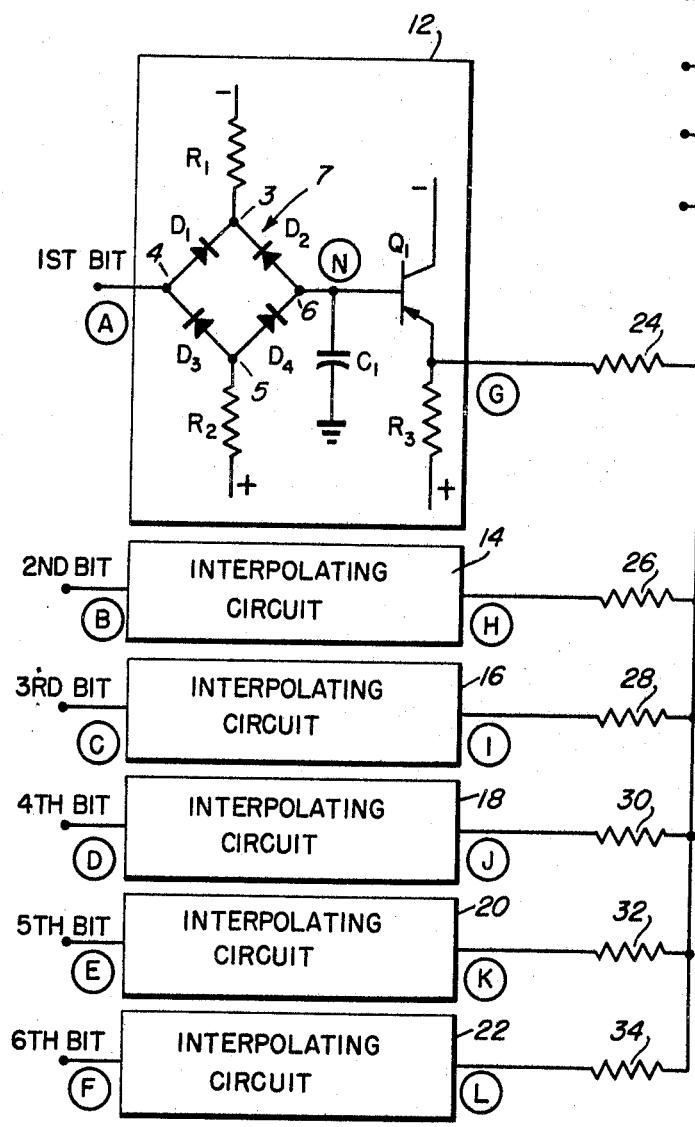

Other objects and features of the invention will become apparent to those skilled in the art as a disclosure is made in the following description of one embodiment of the invention as illustrated in the accompanying drawings in which:

FIG. 1a illustrates one embodiment of the invention;
FIG. 1b illustrates another summing network; and
FIG. 2 illustrates wave shapes at various points of the circuit of FIG. 1a.

Referring now to the drawings wherein like reference characters designate like or corresponding parts throughout the figures, FIG. 1a shows six interpolating circuits, 12, 14, 16, 18, 20 and 22 for binary inputs representing a quantized correlogram function. It is to be understood of course, that additional interpolating channels could be added if more than 6 bits were being smoothed.

In FIG. 1a, interpolating channel 12 is shown as essentially including a diode bridge gating network 7, an energy storage device, such as capacitor $C_1$, and an emitter follower circuit with transistor Q, as the active element thereof. Diode $D_1$ has its anode connected to junction 4 and its cathode connected to input junction 3. Resistor $R_1$ is connected to diodes $D_1$ and $D_2$ at junction 3 and diodes $D_3$ and $D_4$ are connected to resistor $R_2$ at junction 5. Capacitor $C_1$ is connected between junction 6 and ground and is also connected to the base of emitter follower transistor $Q_1$. Each of the other interpolating circuits has identical circuitry.

For purposes of illustration, but in no way intending to limit the scope of invention, the following values of the circuit elements in FIG. 1a may be used for bit pulse inputs which change between 0 v. and −6 v.

$R_1=R_2=R_3=$10K ohms
$C_1=$.013 μf.
Positive battery=12 v.
Negative battery=18 v.

Diode bridge gating network 7 with diodes $D_1$, $D_2$, $D_3$ and $D_4$ in each of the arms of the network connects a first bit waveform at junction 4 to a capacitor $C_1$ at junction 6. When an input signal A, which may be of the shape shown in FIG. 2 is at rest (0 volts), diodes $D_1$, $D_2$, $D_3$ and $D_4$ are all biased in conduction with the voltage at N the same as at A. When the input voltage A switches from 0 volt to −6 volts, diodes $D_1$ and $D_4$ become reverse biased and cease conduction allowing current to flow through resistor $R_1$ into capacitor $C_1$, where upon the voltage at N begins a negative rise. When the voltage N across the capacitor $C_1$ reaches −6 volts, all four diodes conduct, again closing diode network 7 so that the circuit is again at rest. The circuit remains at rest until input A switches back to 0 volts when diodes $D_2$ and $D_3$ are reversed biased so that capacitor $C_1$ discharges through diode $D_4$ and resistor $R_2$ at which time the voltage at N begins a positive rise.

Resistors $R_1$ and $R_2$ and capacitor $C_1$ are chosen to have values such that the rise time constants of $R_1$, $C_1$ and $R_2$, $C_1$ are just long enough to permit a 6 volt change in the voltage at N before the time of the next switching pulse at A.

Emitter follower transistor $Q_1$ has its base connected to junction 6, its collector connected to negative battery, and its emitter connected through resistor $R_3$ to positive battery. The emitter follower $Q_1$ reduces loading on capacitor $C_1$. The voltage at G is the same as at N except for a small DC offset. The output G shown in FIG. 2 is an interpolated waveform of the first bit of a plurality of bits representing a digital number.

The circuits for the 2nd through 6th bits operate in the same manner with interpolating circuit 14 producing interpolating waveform H for input signal B, circuit 16 producing waveform I for input C, circuit 18 producing waveform J for input D, circuit 20 producing waveform K for input E, and interpolating circuit 22 producing a waveform L for input F.

Each of the voltage waveforms G through L pass through one of the summing resistors 24, 26, 28, 30, 32 and 34. For a summing network of this type it is desirable to weight each bit accordingly by making resistor 26 equal to twice the value of resistor 24, resistor 28 equal to twice the value of resistor 26, resistor 30 equal to twice the value of resistor 28, etc. A weighted sum input therefore, shown in FIG. 2, gives the analog voltage output N which can be seen on an oscilloscope as a continuous waveform of connected straight line segments.

FIG. 1b illustrates an alternative summing network having resistors 40, 41, 42, 43, 44 and 45 connected one in each of the interpolating circuit channels. A voltage divider having resistor segments 50, 51, 52, 53, 54 and 55 is connected between ground and output terminal M. Resistors 40-45 and 55 have equal values which may be on the order of approximately 10K ohms while resistor segments 50-54 have equal values of approximately 5K ohms each. This summing network presents the same load to each interpolator stage which relaxes the gain requirement on the buffer transistors.

From the foregoing it can be seen that an analog waveform suitable for display on an oscilloscope is provided by the linear interpolator circuitry of the present invention giving a non-distorted visual display from digital quantized information.

Obviously many modifications and variations of the present invention are possible in the light of the above teachings. It is therefore to be understood that within the scope of the appended claims the invention may be practiced otherwise than as specifically described.

What is claimed is:

1. A linear interpolator circuit for smoothing a series of binary pulse input signals forming an analog waveform for visual presentation comprising, four semiconductor diodes arranged to form a four-arm, four-junction switching network having a signal input terminal connected to the input junction of said network;

biasing means including a first resistor connected to a first biasing junction of said network and a second resistor connected to a second biasing junction of said network, said biasing means holding said diodes in a conductive state when said input terminal has no signal changes applied thereto, reverse biasing two of said diodes when an input signal changes positively, and reverse biasing the other two of said diodes when input signal changes negatively;

a capacitor connected to an output junction of said network charging when said first two diodes are nonconducting, and discharging when said second two diodes are nonconducting; and a transistor connected in emitter follower configuration with said network output junction, providing an interpolated waveform output at the emitter thereof in accordance with binary pulse input signals.

2. A linear interpolator comprising a plurality of pulse-input, linear output interpolating channels, one for each bit of several bits representing quantized values of a digital number, each of said channels having an input terminal for receiving an individual pulse input and an output terminal, a gating network in each channel connected to the input terminal thereof;

an emitter follower circuit in each channel connected to the output terminal thereof;

energy storage means in each channel interconnecting the gating network and emitter follower circuit thereof, said energy storage means being chargeable through said gating network in response to the presence of a bit received by said input terminal and being dischargeable through said gating network upon termination of receipt of a bit; and a summing network having a single output terminal and a plurality of input terminals each of said input terminals of said summing network being individually connected to the output terminal of one of said interpolating channels for providing an analog voltage waveform representative of said correlogram digital number being provided at said summing network output terminal.

3. The apparatus of claim 2 wherein said summing network contains a plurality of resistors equal in number to the number of said interpolating channels, each of said resistors being individually connected to the output terminal of one of said interpolating channels.

4. The apparatus of claim 2 wherein said summing network comprises a plurality of channel resistors connected one to each of said summing network inputs, and a voltage divider connected between said summing network output terminal and ground having a plurality of taps connected thereto, each of said taps connecting one of said channel resistors to said voltage divider.

5. A linear interpolator circuit for smoothing a plurality of quantized binary pulse input signals representing a correlogram function digital number forming an analog voltage waveform for visual display thereof comprising, a plurality of interpolator channels each having an input terminal for one of a plurality of binary signal values and included in each channel, four semiconductor diodes arranged to form a four-arm, four-junction switching network having a signal input terminal connected to the input junction of said network;

biasing means including a first resistor connected to a first biasing junction of said network and a second resistor connected to a second biasing junction of said network, said biasing means holding said diodes in a conductive state when said input terminal has no signal changes applied thereto, reverse biasing two of said diodes when an input signal changes positively, and reverse biasing the other two of said diodes when input signal changes negatively;

a capacitor connected to an output junction of said network charging when said first two diodes are nonconducting, and discharging when said second two diodes are nonconducting, and a transistor connected in emitter follower configuration with said network output junction, providing an interpolated wave form output at the emitter thereof in accordance with binary pulse input signals; and a summing network having a single output terminal and a plurality of input terminals each of said network input terminals connected to a respective one of said emitter output terminals, a linear interpolated analog voltage waveform being provided at the output terminal of said summing network in accordance with quantized digital input signals.

6. The apparatus of claim 5 wherein said summing network contains a plurality of resistors equal in number to the number of channel inputs, each of said resistors connected between one respective input terminal and said network output terminal.

7. The apparatus of claim 5 wherein said summing network comprises a plurality of channel resistors connected one to each of said network inputs, and a voltage divider connected between said network output terminal and ground having a plurality of taps connected thereto, each of said taps connecting one of said channel resistors to said voltage divider.

References Cited

UNITED STATES PATENTS

| | | | |
|---|---|---|---|
| 2,885,663 | 5/1959 | Curtis | 340—347 |
| 3,289,064 | 11/1966 | Doyle et al. | 320—1 |
| 3,311,740 | 3/1967 | Urban | 320—1 |

OTHER REFERENCES

Grabbe et al. (ed.): Handbook of Automation, Computation, and Control, vol. 2, John Wiley & Sons Inc., New York, pp. 23–20, 23–21.

MAYNARD R. WILBUR, Primary Examiner

GARY R. EDWARDS, Assistant Examiner

U.S. Cl. X.R.

320—1; 328—14